(12) United States Patent
Babitz

(10) Patent No.: US 9,534,177 B2
(45) Date of Patent: Jan. 3, 2017

(54) CATALYST, A PROCESS FOR ITS PREPARATION, AND ITS USE

(75) Inventor: Scott Michael Babitz, Princeton Junction, NJ (US)

(73) Assignee: Albemarle Netherlands, B.V. (NL)

( * ) Notice: Subject to any disclaimer, the term of this patent is extended or adjusted under 35 U.S.C. 154(b) by 61 days.

(21) Appl. No.: 13/172,149

(22) Filed: Jun. 29, 2011

(65) Prior Publication Data

US 2011/0263412 A1    Oct. 27, 2011

Related U.S. Application Data

(63) Continuation of application No. 12/636,626, filed on Dec. 11, 2009, now abandoned, which is a continuation of application No. 11/722,250, filed as application No. PCT/EP2005/056984 on Dec. 20, 2005, now abandoned.

(60) Provisional application No. 60/637,447, filed on Dec. 21, 2004.

(30) Foreign Application Priority Data

Mar. 9, 2005    (EP) ..................................... 05075578

(51) Int. Cl.

| | | |
|---|---|---|
| *B01J 29/06* | (2006.01) | |
| *B01J 37/00* | (2006.01) | |
| *C10G 2/00* | (2006.01) | |
| *B01D 53/94* | (2006.01) | |
| *B01J 29/08* | (2006.01) | |
| *C01B 3/02* | (2006.01) | |
| *C10G 1/08* | (2006.01) | |
| *C10G 11/05* | (2006.01) | |
| *C10G 29/20* | (2006.01) | |
| *C10G 35/06* | (2006.01) | |
| *C10G 49/02* | (2006.01) | |
| *B01J 35/00* | (2006.01) | |

(52) U.S. Cl.
CPC .................. *C10G 2/33* (2013.01); *B01D 53/94* (2013.01); *B01J 29/06* (2013.01); *B01J 29/084* (2013.01); *B01J 37/0045* (2013.01); *C01B 3/02* (2013.01); *C10G 1/086* (2013.01); *C10G 11/05* (2013.01); *C10G 29/205* (2013.01); *C10G 35/06* (2013.01); *C10G 49/02* (2013.01); *B01J 35/002* (2013.01); *B01J 2229/42* (2013.01); *C01B 2203/1041* (2013.01)

(58) Field of Classification Search
USPC .. 502/64, 68, 80, 81, 83, 84, 232, 240, 263, 502/300, 355
See application file for complete search history.

(56) References Cited

U.S. PATENT DOCUMENTS

| | | | |
|---|---|---|---|
| 5,194,243 | A | 3/1993 | Pearson et al. |
| 5,601,699 | A * | 2/1997 | Degnan et al. ............... 208/114 |
| 6,036,847 | A | 3/2000 | Ziebarth et al. |
| 6,214,211 | B1 | 4/2001 | Itoh |
| 6,555,496 | B1 | 4/2003 | Stamires et al. |
| 2004/0266608 | A1 | 12/2004 | Long et al. |

FOREIGN PATENT DOCUMENTS

| | | | |
|---|---|---|---|
| CN | 1 119 390 A | 8/2003 | |
| CN | 1119390 C * | 8/2003 | ............ C10G 11/05 |
| CN | 1 552 805 A | 12/2004 | |
| EP | 1 264 635 A1 | 12/2002 | |
| EP | 0 837 118 B1 | 12/2004 | |
| GB | 1 422 451 A | 1/1976 | |

* cited by examiner

*Primary Examiner* — Colin W Slifka
(74) *Attorney, Agent, or Firm* — Nathaniel C. Dunn; James A. Jubinsky; Marcy M. Hoefling

(57) ABSTRACT

Process for the preparation of a catalyst comprising the steps of (a) preparing a slurry comprising clay, zeolite, and quasi-crystalline boehmite, provided that the slurry does not comprise peptized quasi-crystalline boehmite, (b) adding a monovalent acid to the slurry, (c) adding a silicon source to the slurry, and (d) shaping the slurry to form particles. This process leads to a catalyst with high accessibility and high attrition resistance.

8 Claims, No Drawings

CATALYST, A PROCESS FOR ITS PREPARATION, AND ITS USE

This application is a continuation of U.S. patent application Ser. No. 12/636,626, filed Dec. 11, 2009, which, in turn, is a continuation of U.S. patent application Ser. No. 11/722,250, filed Jun. 20, 2007, now abandoned, which, in turn, claims the benefit of International Patent Application No. PCT/EP2005/056984, filed Dec. 20, 2005, which, in turn, claims the benefit and priority of EP Patent Application No. 05075578.4, filed Mar. 9, 2005 and U.S. Provisional Application No. 60/637,447, filed Dec. 21, 2004, the disclosures of which are incorporated herein by reference.

The present invention relates to a process for the preparation of a catalyst, catalysts obtainable by this process, and their use in, e.g., fluid catalytic cracking (FCC).

A common challenge in the design and production of heterogeneous catalysts is to find a good compromise between the effectiveness and/or accessibility of the active sites and the effectiveness of the immobilising matrix in giving the catalyst particles sufficient physical strength, i.e. attrition resistance.

The preparation of attrition resistant catalysts is disclosed in several prior art documents.

U.S. Pat. No. 4,086,187 discloses a process for the preparation of an attrition resistant catalyst by spray-drying an aqueous slurry prepared by mixing (i) a faujasite zeolite with a sodium content of less than 5 wt % with (ii) kaolin, (iii) peptised pseudoboehmite, and (iv) ammonium polysilicate.

The attrition resistant catalysts according to U.S. Pat. No. 4,206,085 are prepared by spray-drying a slurry prepared by mixing two types of acidified pseudoboehmite, zeolite, alumina, clay, and either ammonium polysilicate or silica sol.

GB 1 315 553 discloses the preparation of an attrition resistant hydrocarbon conversion catalyst comprising a zeolite, a clay, and an alumina binder. The catalyst is prepared by first dry mixing the zeolite and the clay, followed by adding an alumina sol. The resulting mixture is then mixed to a plastic consistency, which requires about 20 minutes of mixing time. In order to form shaped particles, the plastic consistency is either pelletised or extruded, or it is mixed with water and subsequently spray-dried.

The alumina sol disclosed in this British patent specification comprises aluminium hydroxide and aluminium trichloride in a molar ratio of 4.5 to 7.0 (also called aluminium chlorohydrol).

U.S. Pat. No. 4,458,023 relates to a similar preparation procedure, which is followed by calcination of the spray-dried particles. During calcination, the aluminium chlorohydrol component is converted into an alumina binder.

WO 96/09890 discloses a process for the preparation of attrition resistant fluid catalytic cracking catalysts. This process involves the mixing of an aluminium sulphate/silica sol, a clay slurry, a zeolite slurry, and an alumina slurry, followed by spray-drying. During this process, an acid- or alkaline-stable surfactant is added to the silica sol, the clay slurry, the zeolite slurry, the alumina slurry and/or the spray-drying slurry.

CN 1247885 also relates to the preparation of a spray-dried cracking catalyst. This preparation uses a slurry comprising an aluminous sol, pseudoboehmite, a molecular sieve, clay, and an inorganic acid. In this process the aluminous sol is added to the slurry before the clay and the inorganic acid are added, and the molecular sieve slurry is added after the inorganic acid has been added. According to one embodiment, pseudoboehmite and aluminium sol are first mixed, followed by addition of the inorganic acid. After acidification, the molecular sieve is added, followed by kaolin.

WO 02/098563 discloses a process for the preparation of an FCC catalyst having both a high attrition resistance and a high accessibility. The catalyst is prepared by slurrying zeolite, clay, and boehmite, feeding the slurry to a shaping apparatus, and shaping the mixture to form particles, characterised in that just before the shaping step the mixture is destabilised. This destabilisation is achieved by, e.g., temperature increase, pH increase, pH decrease, or addition of gel-inducing agents such as salts, phosphates, sulphates, and (partially) gelled silica. Before destabilisation any peptisable compounds present in the slurry must have been well peptised.

Although the catalyst according to the latter document has a relatively high attrition resistance and accessibility, it has now been found that the accessibility and attrition resistance can be further improved.

This further improvement is achieved by the process according to the invention, which process comprises the steps of:
  a) preparing a slurry comprising clay, zeolite, and quasi-crystalline boehmite, provided that the slurry does not comprise peptised quasi-crystalline boehmite,
  b) adding a monovalent acid to the slurry,
  c) adding a silicon source to the slurry, and
  d) shaping the slurry to form particles, In contrast to conventional processes where quasi-crystalline boehmites (e.g. pseudoboehmites) always have been peptised before addition to the zeolite-containing slurry, the process according to the invention adds non-peptised quasi-crystalline boehmite (QCB). Acid is only added after QCB addition, i.e. to a slurry that also comprises zeolite and clay.

Without wishing to be bound by theory, we believe that in said conventional processes, negatively charged silica reacts with the later added, positively charged peptised boehmite, thereby forming a Si—Al cogel. In the process of the present invention, where acid is added to a slurry containing the zeolite, boehmite, and clay, the surfaces of all of these three compounds can become positively charged. The later added silica will interact with all these positively charged ingredients, not only with the boehmite, resulting in the formation of less Si—Al cogel. This leads to catalyst particles with a higher accessibility.

An additional advantage of the process according to the invention is that it enables the formation of catalysts comprising both micro- and quasi-crystalline boehmites with an accessibility and an attrition resistance sufficient for use in FCC.

Micro-crystalline boehmite (MCB) is a suitable metal passivator, in particular for Ni contaminants. However, up to now the preparation of MCB-containing FCC catalyst particles has been unsuccessful, because MCB is difficult to bind with conventional FCC-type binders, leading to catalyst particles with unacceptable attrition. However, with the process according to the present invention, it is now possible to prepare MCB-containing catalysts with satisfactory attrition resistance. The invention therefore also relates to FCC catalysts comprising both MCB and QCB.

Boehmite

The term "boehmite" is used in the industry to describe alumina hydrates which exhibit X-ray diffraction (XRD) patterns close to that of aluminium oxide-hydroxide [AlO(OH)]. Further, the term boehmite is generally used to describe a wide range of alumina hydrates, which contain different amounts of water of hydration, have different surface areas, pore volumes, specific densities, and exhibit different thermal characteristics upon thermal treatment. Yet their XRD patterns, although they exhibit the characteristic boehmite [AlO(OH)] peaks, usually vary in their widths and can also shift in their location. The sharpness of the XRD peaks and their location have been used to indicate the degree of crystallinity, crystal size, and amount of imperfections.

Broadly, there are two categories of boehmite aluminas: quasi-crystalline boehmites (QCBs) and micro-crystalline boehmites (MCBs).

In the state of the art, quasi-crystalline boehmites are also referred to as pseudo-boehmites and gelatinous boehmites. Usually these QCBs have higher surface areas, larger pores and pore volumes, and lower specific densities than MCBs. They disperse easily in water or acids, have smaller crystal sizes than MCBs, and contain a larger number of water molecules of hydration. The extent of hydration of QCBs can have a wide range of values, for example from about 1.4 up to about 2 moles of water per mole of Al, intercalated usually orderly or otherwise between the octahedral layers.

DTG (differential thermographimetry) indicates that the major amount of water is released from QCBs at a much lower temperature than from MCBs.

The XRD Patterns of QCBs show quite broad peaks and their half-widths (i.e. the widths of the peaks at half-maximum intensity) are indicative of the crystal sizes as well as the degree of crystal perfection.

Some typical commercially available QCBs are Pural®, Catapal®, and Versal® products.

Microcrystalline boehmites are distinguished from the QCBs by their high degree of crystallinity, relatively large crystal size, very low surface areas, and high densities. Contrary to QCBs, MCBs show XRD patterns with higher peak intensities and very narrow half-widths. This is due to their relatively small number of intercalated water molecules, large crystal sizes, the higher degree of crystallization of the bulk material, and the smaller amount of crystal imperfections. Typically, the number of water molecules intercalated can vary in the range from about 1 up to about 1.4 per mole of Al.

A typical commercially available MCB is Sasol's P-200®.

MCBs and QCBs are characterised by powder X-ray reflections. The ICDD contains entries for boehmite and confirms that reflections corresponding to the (020), (021), and (041) planes would be present. For copper radiation, such reflections would appear at 14, 28, and 38 degrees 2-theta. The exact position of the reflections depends on the extent of crystallinity and the amount of water intercalated: as the amount of intercalated water increases, the (020) reflection moves to lower values, corresponding to greater d-spacings. Nevertheless, lines close to the above positions would be indicative of the presence of one or more types of boehmite phases.

For the purpose of this specification we define quasi-crystalline boehmites as having a (020) reflection with a full width at half height (FWHH) of 1.5° or greater than 1.5° 2θ. Boehmites having a (020) reflection with a FWHH of smaller than 1.5° 2θ are considered micro-crystalline boehmites.

Overall, the basic, characteristic differences between QCBs and MCBs involve variations in the following: 3-dimensional lattice order, sizes of the crystallites, amount of water intercalated between the octahedral layers, and degree of crystal imperfections.

Zeolite

Suitable zeolites to be present in the slurry of step a) include zeolites such as Y-zeolites—including HY, USY, RE-Y, dealuminated Y, and RE-USY zeolite beta, ZSM-5, phosphorus-activated ZSM-5, ion-exchanged ZSM-5, MCM-22, and MCM-36, metal-exchanged zeolites, ITQs, SAPOs, ALPOs, and mixtures thereof.

Clay

Suitable clays include kaolin, bentonite, saponite, sepiolite, attapulgite, laponite, hectorite, English clay, anionic clays such as hydrotalcite, and heat- or chemically treated clays such as meta-kaolin.

Step a)

The slurry of step a) is prepared by suspending clay, zeolite, and non-peptised QCB in water. Optionally, other components may be added, such as other alumina sources—like MCB, aluminium chlorohydrol, aluminium nitrate, $Al_2O_3$, and $Al(OH)_3$—anionic clays (e.g. hydrotalcite), smectites, sepiolite, barium titanate, calcium titanate, calcium silicates, magnesium silicates, magnesium titanate, mixed metal oxides, layered hydroxy salts, additional zeolites, magnesium oxide, bases or salts, and/or metal additives such as compounds containing an alkaline earth metal (for instance Mg, Ca, and Ba), a Group IIIA transition metal, a Group IVA transition metal (e.g. Ti, Zr), a Group VA transition metal (e.g. V, Nb), a Group VIA transition metal (e.g. Cr, Mo, W), a Group VIIA transition metal (e.g. Mn), a Group VIIIA transition metal (e.g. Fe, Co, Ni, Ru, Rh, Pd, Pt), a Group IB transition metal (e.g. Cu), a Group JIB transition metal (e.g. Zn), a lanthanide (e.g. La, Ce), or mixtures thereof.

An especially preferred component is MCB, because that results in the preparation of a catalyst comprising both MCB and QCB.

The clay, zeolite, non-peptised QCB, and optional other components can be slurried by adding them to water as dry solids. Alternatively, slurries containing the individual materials are mixed to form the slurry according to step a). It is also possible to add some of the materials as slurries and others as dry solids.

Any order of addition may be used. Hence, it is possible to first add the clay, then the zeolite, and then the non-peptised QCB, or to first add the zeolite, then the clay, and then the non-peptised QCB, or to first add the non-peptised QCB, then the zeolite, and finally the clay, or to first add the non-peptised QCB, then the clay, and finally the zeolite, or to first add the clay, then the non-peptised QCB, and finally the zeolite, or to first add the zeolite, then the non-peptised QCB, and finally the clay.

It is also possible to add the zeolite, the non-peptised QCB, and the clay all at the same time. Further, two of the ingredients, e.g. zeolite and clay, can be added at the same time, while the other ingredient, e.g. non-peptised QCB, is added subsequently.

The optional other components can be added to the slurry together with, prior to or subsequent to the addition of the zeolite, the clay, and the non-peptised QCB.

The slurry preferably comprises 10 to 70 wt %, more preferably 15 to 50 wt %, and most preferably 15 to 40 wt % of zeolite.

The slurry preferably comprises 5 to 70 wt %, more preferably 10 to 60 wt %, and most preferably 10 to 50 wt % of clay.

The slurry preferably comprises 1 to 50 wt %, more preferably 2 to 40 wt %, and most preferably 3 to 40 wt % of non-peptised QCB.

More preferably, the slurry also comprises 1 to 25 wt %, and most preferably 5 to 25 wt % of MCB.

All weight percentages are based on dry solids content and calculated as oxides.

The solids content of the slurry preferably is 10-30 wt %, more preferably 15-30 wt %, and most preferably 15-25 wt %.

Step b)

In a next step, a monovalent acid is added to the suspension, causing digestion. Both organic and inorganic monovalent acids can be used, or a mixture thereof. Examples of suitable monovalent acids are formic acid, acetic acid, propionic acid, nitric acid, and hydrochloric acid.

The acid is added to the slurry in an amount sufficient to obtain a pH lower than 7, more preferably between 2 and 5, most preferably between 3 and 4.

During acid addition, the slurry may be stirred, milled, grinded, high-shear mixed, or treated with ultrasound waves.

Step c)

Suitable silicon sources to be added in step c) include (poly)silicic acid, sodium silicate, sodium-free silicon sources, and organic silicon sources. Examples of suitable sodium-free silicon sources are potassium silicate, lithium silicate, calcium silicate, magnesium silicate, barium silicate, strontium silicate, zinc silicate, phosphorus silicate, and borium silicate. Examples of suitable organic silicon sources are silicones (polyorganosiloxanes such as polymethylphenylsiloxane and polydimethylsiloxane) and other compounds containing Si—O—C—O—Si structures, and precursors thereof such as methyl chlorosilane, dimethyl chlorosiline, trimethyl chlorosilane, and mixtures thereof.

The silicon source is preferably added in an amount of 1-35 wt %, more preferably 4-18 wt %, based on dry solids content and calculated as $SiO_2$.

In a preferred embodiment of the invention, no silicon source is present in the slurry of step a). This prevents the formation of Si—Al cogels even more.

Step d)

Suitable shaping methods include spray-drying, pulse drying, pelletising, extrusion (optionally combined with kneading), beading, or any other conventional shaping method used in the catalyst and absorbent fields or combinations thereof. A preferred shaping method is spray-drying. If the catalyst is shaped by spray-drying, the inlet temperature of the spray-dryer preferably ranges from 300 to 600° C. and the outlet temperature preferably ranges from 105 to 200° C.

It is preferred to add the silicon source in step c) just before the shaping step d). The time period between the addition of the silicon source and shaping preferably is 30 minutes or less, more preferably less than 5 minutes, and most preferably less than 3 minutes.

The pH of the slurry to be spray-dried preferably is above 3, more preferably above 3.5, even more preferably above 4, and most preferably about 4.5 or higher. The pH of the slurry preferably is not higher than 7, because slurries with a higher pH can be difficult to handle.

The pH can be adjusted by adding a base (e.g. NaOH or $NH_4OH$) to the slurry just before spray-drying.

The catalyst so obtained has exceptionally good attrition resistance and accessibility. Therefore, the invention also relates to a catalyst obtainable by the process according to the invention.

As mentioned above, the invention further relates to a catalyst comprising both MCB and QCB. Preferably, such a catalyst comprises 1-50 wt %, most preferably 3-40 wt % of QCB, and preferably 1-25, most preferably 5-25 wt % of MCB (calculated as oxides).

This catalyst further comprises silica, zeolite, and clay. Besides the QCB and the optional MCB, the silica, zeolite, and clay are present in preferred amounts of 1-25 wt % silica, 5-50 wt % zeolite, and balance clay.

These catalysts can be used as FCC catalysts, FCC additives—such as $SO_x$ reduction additives, $NO_x$ reduction additives, CO combustion additives, ZSM-5 additives, or sulphur in gasoline reduction additives—in hydroprocessing catalysts, alkylation catalysts, reforming catalysts, gas-to-liquid conversion catalysts, coal conversion catalysts, hydrogen manufacturing catalysts, and automotive catalysts.

The invention therefore also relates to the use of these catalyst obtainable by the process of the invention as catalyst or additive in fluid catalytic cracking, hydroprocessing, alkylation, reforming, gas-to-liquid conversion, coal conversion, and hydrogen manufacturing, and as automotive catalyst.

EXAMPLES

Accessibility Measurement

The accessibility of the catalysts prepared according to the Examples below was measured by adding 1 g of the catalyst to a stirred vessel containing 50 g of a 15 g/l Kuwait vacuum gas oil (KVGO) in toluene solution. The solution was circulated between the vessel and a spectrophotometer, in which process the KVGO-concentration was continuously measured.

The accessibility of the catalysts to KVGO was quantified by the Akzo Accessibility Index (AAI). The relative concentration of KVGO in the solution was plotted against the square root of time. The AAI is defined as the initial slope of this graph:

$$AAI = -d(C_t/C_0)/d(t^{1/2}) * 100\%$$

In this equation, t is the time (in minutes) and $C_0$ and $C_t$ denote the concentrations of high-molecular weight compound in the solvent at the start of the experiment and at time t, respectively.

Attrition Resistance

The attrition resistance of the catalysts was measured by the standard Attrition Test. In this test the catalyst bed resides on an attrition plate with three nozzles. The attrition plate is situated within an attrition tube, which is at ambient temperature. Air is forced to the nozzles and the resulting jets bring about upward transport of catalyst particles and generated fines. On top of the attrition tube is a separation chamber where the flow dissipates, and most particles larger than about 16 microns fall back into the attrition tube. Smaller particles are collected in a collection bag.

This test is conducted after calcination of the catalyst samples at 600° C., and it is first run for 5 hours and the weight percentage of fines collected in the collection bag, based on an imaginary intake of 50 grams, is determined. This is the initial attrition. The test is then conducted for another 15 hours and the weight percentage of fines in this time period (5-20 hours) is determined. This is the inherent attrition. The Attrition Index (AI) is the extrapolated wt % fines after 25 hours. So, the more attrition resistant the catalyst is, the lower the AI value.

Example 1

A slurry was prepared by mixing 60.6 kg of a zeolite Y slurry (29.7 wt % solids) with 23.3 kg of a microcrystalline boehmite slurry (23.2 wt % $Al_2O_3$), 16.2 kg of a kaolin slurry (85.3 wt % solids), 14.2 kg of slurry containing non-peptised pseudoboehmite (71.9 wt % $Al_2O_3$), and 48.9 kg water. $HNO_3$ was added to the resulting slurry until the pH was 3.3.

A silica sol was made in a pipeline mixer (5,900 rpm) by mixing diluted water glass (DWG) with $H_2SO_4$. The weight ratio $DWG/H_2SO_4$ was 2.9.

Both this silica sol and the slurry prepared above were pumped to a mixing vessel (1450 rpm), resulting in a slurry of 21 wt % solids. The silica sol was pumped to this vessel with a flow of 0.88 kg/min; the slurry was pumped with a flow of 2.12 kg/min. The resulting slurry, which had a pH of about 2.5, was then fed to a spray-dryer with a flow of 3.0 kg/min, an inlet temperature of 300° C., an outlet temperature of 125° C., and a nozzle pressure of 40 bar.

The spray-dried particles had a d50 of about 75 microns.

The particles contained 30 wt % zeolite, 17 wt % QCB, 9 wt % MCB, 21 wt % silica, and balance kaolin.

Using this recipe, four samples according to the invention were made:

Sample A1 was made exactly as above;

Sample B1 was obtained by adding caustic to the slurry just before spray-drying, thereby arriving at a pH of 3.8;

Sample C1 was obtained by adding caustic to the slurry just before spray-drying, thereby arriving at a pH of 4.2;

Sample D1 was obtained by adding caustic to the slurry just before spray-drying, thereby arriving at a pH of 4.6.

Two comparative samples (CC1 and CD1) were made by the same procedure by increasing the pH to 4.2 (CC1) and 4.6 (CD1) just before spray-drying, except that peptised pseudoboehmite (peptised with nitric acid) was used.

The samples were subsequently washed in order to reduce their sodium content to below 0.5 wt % (as $Na_2O$) by re-slurrying 12 kg of the particles in a 40-litre ammonia solution at pH 5.0. Next, the particles were filtered and washed with a 30-litre ammonia solution containing 420 g ammonium sulphate and a pH of 8.3, re-slurried again in a 30-litre ammonia solution at pH 7.8, and filtered and washed again with a 30-litre ammonia solution containing 420 g ammonium sulphate at pH 8.3. Finally, the particles were washed with water and subsequently flash-calcined (outlet gas temperature 150° C.).

All washing steps were conducted at 45° C.

The Attrition Index (AI) and Akzo Accessibility Index (AAI) were measured for all the above samples: see Table 1. This Table also indicates the ratio AAI/AI. It is clear that the catalysts prepared according to the process of the present invention have a lower attrition (i.e. a higher attrition resistance) and a higher AAI/AI ratio. Comparing the results for Samples A1 through D1 further shows that the accessibility increases with the pH just before spray-drying.

line boehmite slurry (23.2 wt % $Al_2O_3$), 24.619 kg of a kaolin slurry (85.3 wt % solids), 8.054 kg of slurry containing non-peptised pseudoboehmite (74.5 wt % $Al_2O_3$), and 48.9 kg water. To the resulting slurry, 5.6 kg HNO3 were added until the pH was 3.3.

A silica sol was made in a pipeline mixer (5,900 rpm) by mixing diluted water glass (DWG) with $H_2SO_4$. The weight ratio $DWG/H_2SO_4$ was 2.92.

Both this silica sol and the slurry prepared above were pumped to a mixing vessel (1,450 rpm), resulting in a slurry of 25 wt % solids. The silica sol was pumped to this vessel with a flow of 0.75 kg/min; the slurry was pumped with a flow of 2.25 kg/min. The resulting slurry, which had a pH of about 2.5, was then fed to a spray-dryer with a flow of 3.0 kg/min, an inlet temperature of 300° C., an outlet temperature of 125° C., and a nozzle pressure of 40 bar.

The spray-dried particles had a d50 of about 75 microns.

The particles contained 30 wt % zeolite, 10 wt % QCB, 10 wt % MCB, 15 wt % silica, and balance kaolin.

Using this recipe, four samples according to the invention were made:

Sample A2 was made exactly as above;

Sample B2 was obtained by adding caustic to the slurry just before spray-drying, thereby arriving at a pH of 3.8;

Sample C2 was obtained by adding caustic to the slurry just before spray-drying, thereby arriving at a pH of 4.2;

Sample D2 was obtained by adding caustic to the slurry just before spray-drying, thereby arriving at a pH of 4.6.

Two comparative samples (CB2 and CE2) were made by the same procedure by increasing the pH to 3.8 (CB2) or 5 (CE2) just before spray-drying, except that peptised pseudoboehmite was used.

The samples were subsequently washed in order to reduce their sodium content to below 0.5 wt % (as $Na_2O$) by re-slurrying 12 kg of the particles in a 40-litre ammonia solution at pH 5.0. Next, the particles were filtered and washed with a 30-litre ammonia solution containing 420 g ammonium sulphate and a pH of 8.3, reslurried again in a 30-litre ammonia solution at pH 7.8, and filtered and washed again with a 30-litre ammonia solution containing 420 g ammonium sulphate at pH 8.3. Finally, the particles were washed with water and subsequently flash-calcined (outlet gas temperature 150° C.).

All washing steps were conducted at 45° C.

The Attrition Index (AI) and Akzo Accessibility Index (AAI) were measured for all the above samples: see Table 2. This Table also indicates the ratio AAI/AI. This ratio is substantially higher for the catalysts according to the invention than for the comparative catalysts. Again, this Table shows that the accessibility increases with the pH before spray-drying.

TABLE 1

| Sample | AI | AAI | AAI/AI |
|--------|------|-----|--------|
| A1 | 1.2 | 0.9 | 0.8 |
| B1 | 2.5 | 3.3 | 1.3 |
| C1 | 2.7 | 4.4 | 1.6 |
| D1 | 4.5 | 6.6 | 1.5 |
| CC1 | 6 | 4.5 | 0.75 |
| CD1 | 10.1 | 6.1 | 0.6 |

TABLE 2

| Sample | AI | AAI | AAI/AI |
|--------|-----|-----|--------|
| A2 | 0.7 | 0.9 | 1.3 |
| B2 | 0.8 | 4.4 | 5.5 |
| C2 | 1.5 | 5.3 | 3.5 |
| D2 | 2.8 | 7.7 | 2.75 |
| CB2 | 2.1 | 2.7 | 1.3 |
| CE2 | 5.7 | 5 | 0.9 |

Example 2

A slurry was prepared by mixing 66.445 kg of a zeolite Y slurry (27.1 wt % solids) with 25.851 kg of a microcrystal- Example 3

A slurry was prepared by mixing 10.4 kg of a zeolite Y slurry (23.1 wt % solids) with kg of a kaolin slurry (86 wt % solids), 16.8 kg of slurry containing non-peptised pseudo-boehmite (17.3 wt % $Al_2O_3$), and 0.92 kg water. To the resulting slurry, $HNO_3$ was added until the pH was 3.3.

A silica sol was made in a pipeline mixer (5,900 rpm) by mixing diluted water glass (DWG) with $H_2SO_4$. The weight ratio $DWG/H_2SO_4$ was 2.3.

Both this silica sol and the slurry prepared above were pumped to a mixing vessel (1450 rpm), resulting in a slurry of 25 wt % solids. The silica sol was pumped to this vessel with a flow of 0.75 kg/min; the slurry was pumped with a flow of 0.93 kg/min. The resulting slurry, which had a pH of about 2.5, was then fed to a spray-dryer with a flow of 3.0 kg/min, an inlet temperature of 500° C., an outlet temperature of 120° C., and a nozzle pressure of 40 bar.

The spray-dried particles had a d50 of about 65 microns.

The particles contained 24 wt % zeolite, 29 wt % QCB, 4 wt % silica, and balance kaolin.

Using this recipe, five samples according to the invention were made:

Sample A3 was made exactly as above;

Sample B3 was obtained by adding ammonia to the slurry just before spray-drying, thereby arriving at a pH of 3.6;

Sample C3 was obtained by adding ammonia to the slurry just before spray-drying, thereby arriving at a pH of 3.9;

Sample D3 was obtained by adding ammonia to the slurry just before spray-drying, thereby arriving at a pH of 4.2.

Sample E3 was obtained by adding ammonia to the slurry just before spray-drying, thereby arriving at a pH of 5.0.

Two comparative samples (CD3 and CE3) were made by the same procedure by increasing the pH to 4.2 (CD3) and 5.0 (CE3) just before spray-drying, except that peptised pseudoboehmite was used.

The samples were subsequently washed in order to reduce their sodium content to below 0.5 wt % (as $Na_2O$) by re-slurrying 2 kg of the particles in hot water and ammonia solution at pH 5.0. Next, 200 g of ammonium sulphate were added to this slurry. The particles were then filtered and washed. The filter cake was re-slurried in hot water with 200 g ammonium sulphate, filtered, washed, and re-slurried in ammonium sulphate again. Finally, the particles were filtered and washed with hot water and ammonia at a pH between 8.0 and 8.5. After a last filtration, the particles were tray-dried in an oven.

Table 3 lists the AI, AAI, and the ratio AAI/AI for these catalysts. Comparison of the results for D3 and E3 with those of CD3 and CE3 illustrates the positive effect of the process of the invention on the accessibility of the catalysts, without giving in on attrition resistance.

Further, the accessibility increases with the pH before spray-drying.

TABLE 3

| Sample | AI | AAI | AAI/AI |
|---|---|---|---|
| A3 | 1.17 | 2.8 | 2.4 |
| B3 | 1.58 | 7 | 4.4 |
| C3 | 8.20 | 10.8 | 1.3 |
| D3 | 5.00 | 13.5 | 2.7 |
| E3 | 7.20 | 20.3 | 2.8 |
| CD3 | 5.00 | 10 | 2 |
| CE3 | 12.6 | 10 | 0.8 |

Example 4

A slurry was prepared by mixing 8 kg of a zeolite Y slurry (25 wt % solids) with 4.17 kg of a kaolin slurry (86 wt % solids), 5 kg micro-crystalline boehmite (25 wt % $Al_2O_3$), 13.3 kg of slurry containing non-peptised pseudoboehmite (17.3 wt % $Al_2O_3$), and 0.92 kg water. To the resulting slurry, $HNO_3$ was added until the pH was 3.3.

A silica sol was made in a pipeline mixer (5,900 rpm) by mixing diluted water glass (DWG) with $H_2SO_4$. The weight ratio $DWG/H_2SO_4$ was 2.36.

Both this silica sol and the slurry prepared above were pumped to a mixing vessel (1450 rpm), resulting in a slurry of 25 wt % solids. The silica sol was pumped to this vessel with a flow of 0.112 kg/min; the slurry was pumped with a flow of 0.888 kg/min. Ammonia was added to the slurry. The slurry was then fed to a spray-dryer with a flow of 3.0 kg/min, an inlet temperature of 500° C., an outlet temperature of 120° C., and a nozzle pressure of 40 bar.

The spray-dried particles had a d50 of about 65 microns.

The particles contained 20 wt % zeolite, 24 wt % QCB, 14 wt % MCB, 6 wt % silica, and balance kaolin.

Using this recipe, two samples according to the invention were made:

Sample A4 was obtained by adding ammonia to the slurry just before spray-drying in such an amount as to reach a pH of 4.2;

Sample B4 was obtained by adding ammonia to the slurry just before spray-drying in such an amount as to reach a pH of 5.0;

One comparative sample (CB4) was made by the same procedure by increasing the pH to 5 just before spray-drying, except that peptised pseudoboehmite was used.

The samples were subsequently washed in order to reduce their sodium content to below 0.5 wt % (as $Na_2O$) by re-slurrying 2 kg of the particles in hot water and ammonia solution at pH 5.0. Next, 200 g of ammonium sulphate were added to this slurry. The particles were then filtered and washed. The filter cake was re-slurried in hot water with 200 g ammonium sulphate, filtered, washed, and re-slurried in ammonium sulphate again. Finally, the particles were filtered and washed with hot water and ammonia at a pH between 8.0 and 8.5. After a last filtration, the particles were tray-dried in an oven.

Table 4 lists the AI, AAI, and the ratio AAI/AI for these catalysts. It clearly shows the positive effect of the process of the invention on the accessibility of these catalysts.

TABLE 4

| Sample | AI | AAI | AAI/AI |
|---|---|---|---|
| A4 | 5.8 | 17 | 2.9 |
| B4 | 8.6 | 26 | 3.0 |
| CB4 | 5.8 | 12 | 2.1 |

The invention claimed is:

1. A process for the preparation of a catalyst comprising the steps of:
    a) preparing a slurry comprising clay, zeolite, and quasi-crystalline boehmite, provided that the slurry does not comprise peptised quasi-crystalline boehmite,
    b) adding a monovalent acid to the slurry,
    c) preparing a silicon source by preparing a slurry of diluted water glass and $H_2SO_4$ at a weight ratio of $DWG/H_2SO_4$ of at least 2.0 in an amount sufficient to provide silica in an amount of 1-35 wt %, based on dry solids content and calculated as $SiO_2$,
    d) adding the silicon source to the slurry of step b) less than 30 minutes before step e) and
    e) shaping the mixture of step d) to form particles.

2. The process according to claim 1 wherein the slurry obtained in step a) does not comprise a silicon source selected from the group consisting of sodium silicate, potassium silicate, lithium silicate, calcium silicate, magnesium silicate, barium silicate, strontium silicate, zinc silicate, phosphorus silicate, borium silicate, polyorganosiloxanes, methyl chlorosilane, dimethyl chlorosiline, trimethyl chlorosilane, and mixtures thereof.

3. The process according to claim 1 further comprising an additional silicon source added in step d), wherein said silicon source is selected from the group consisting of sodium silicate, potassium silicate, lithium silicate, calcium silicate, magnesium silicate, barium silicate, strontium silicate, zinc silicate, phosphorus silicate, borium silicate, polyorganosiloxanes, methyl chlorosilane, dimethyl chlorosiline, trimethyl chlorosilane, and mixtures thereof.

4. The process according to claim 1, further comprising adding a base to the mixture of step (d) prior to the shaping step of step (e).

5. The process according to claim 4, wherein the pH of the mixture is raised by the base to be between about 3 and about 7.

6. The process according to claim 1, wherein the solids content of the slurry is between 10-30 wt %.

7. The process according to claim 1, wherein the solids content of the mixture after step d) is between 20-30 wt %.

8. A catalyst composition comprising clay, zeolite, and quasi-crystalline boehmite, wherein the composition is prepared by a) preparing a slurry comprising clay, zeolite, and quasi-crystalline boehmite, provided that the slurry does not comprise peptised quasi-crystalline boehmite; b) adding a monovalent acid to the slurry; c) preparing a silica source by preparing a slurry of diluted water glass and H2SO4 at a weight ratio of $DWG/H_2SO_4$ of at least 2.00 in an amount sufficient to provide silica in an amount of 1-35 wt %, based on dry solids content and calculated as $SiO_2$; d) adding the silica source to the slurry of step b) less than 30 minutes before step e), and e) shaping the mixture of step d) to form particles.

* * * * *